324-77 CROSS REFERENCE SEARCH ROOM

Feb. 18, 1969 K. H. NORSWORTHY 3,428,794
TIME CORRELATION COMPUTERS
Filed Aug. 17, 1964 Sheet 1 of 6

INVENTOR.
KEITH H. NORSWORTHY
BY Reynolds & Christensen
ATTORNEYS

INVENTOR.
KEITH H. NORSWORTHY

BY Reynolds & Christensen

ATTORNEYS

Feb. 18, 1969 K. H. NORSWORTHY 3,428,794
TIME CORRELATION COMPUTERS
Filed Aug. 17, 1964 Sheet 3 of 6

INVENTOR.
KEITH H. NORSWORTHY
BY
Reynolds & Christensen
ATTORNEYS

FIG. 7. COMPARISON OF SINGLE AND DOUBLE SAMPLING

INVENTOR.
KEITH H. NORSWORTHY
BY Reynolds & Christiansen
ATTORNEYS

INVENTOR.
KEITH H. NORSWORTHY
BY Reynolds & Christensen
ATTORNEYS

Feb. 18, 1969 K. H. NORSWORTHY 3,428,794

TIME CORRELATION COMPUTERS

Filed Aug. 17, 1964 Sheet 6 of 6

INVENTOR.
KEITH H. NORSWORTHY

BY Reynolds & Christensen

ATTORNEYS

United States Patent Office 3,428,794
Patented Feb. 18, 1969

3,428,794

TIME CORRELATION COMPUTERS

Keith Harvey Norsworthy, Seattle, Wash., assignor to The Boeing Company, Seattle, Wash., a corporation of Delaware Filed Aug. 17, 1964, Ser. No. 389,830
U.S. Cl. 235—181 18 Claims
Int. Cl. G06f *15/34;* G06g *7/19*

ABSTRACT OF THE DISCLOSURE

Various improvements in analog time correlation computers are disclosed, generally directed to improving the operation of correlators employing the pulse-amplitude, pulse-duration type of multiplier. The improvements include a sampling technique wherein the voltage on the sample storage capacitor actually "tracks" the input signal for a significant portion of its cycle during a conductive interval of the sampling circuit and thereafter holds the input signal value as of the time the sampling circuit is switched to its nonconductive state, and a "double sampling" arrangement which frees one sampling circuit to sample again during the time its previous sample is being multiplied. The improved correlators further include multipliers which: permit accurate multiplication of samples even though they decay significantly from their initial values during the multiplication interval; include high-pass filter circuits for eliminating the effects of small D-C and low-frequency components resulting from the finite sampling rate and finite averaging time constant; or employ dual output channel arrangements which cancel from the output signal voltage components which are linearly related to the input signals and would otherwise tend to mask the desired correlation signal.

SUMMARY AND BACKGROUND OF THE INVENTION

Generally this invention provides improvements in the type of time correlation computers which operate upon samples of input signals to be analyzed and utilize a pulse-amplitude, pulse-duration type of multiplier. Such correlators have in the past been characterized by overall complexity both in circuitry and operation and by a lack of accuracy in certain respects, particularly in the sampling techniques employed. Accordingly, the invention concerns improved correlator circuitry, including circuitry and techniques for sampling signals to be analyzed, a technique for multiplying signal sample voltages experiencing significant decay during storage, and improved techniques for eliminating from the output of the pulse-amplitude, pulse-duration multiplier certain voltage components which normally serve only to mask the desired product signal. While the invention is described herein in terms of certain preferred forms thereof, it will be recognized by those skilled in the art that modifications may be made without departing from the principal features involved. This application is a continuation-in-part of two copending applications of the same inventor, entitled, respectively, "Multichannel Correlator System," Ser. No. 256,187, filed Jan. 17, 1963, and "Simple Time Correlation Computer," Ser. No. 303,903, filed Aug. 22, 1963, both now abandoned.

A typical approach for obtaining signal samples in time correlation computers has been to generate a series of narrow clock pulses which are modulated in height according to instantaneous values of the input signals and then stretched for multiplication. The voltage on a storage capacitor in the modulation circuit is usually altered rapidly within a sample ambiguity interval from some existing level to a new level influenced by the maximum level of the input signal during the sampling interval.

Time for changing the capacitor voltage is kept to a minimum by appropriate circuit techniques, but still remains an appreciable portion of the sample storage time, typically one percent. Sampling of high frequency signals according to this technique is particularly susceptible to inaccuracies because the sample ambiguity interval becomes comparable to the period of signal components.

Another approach has been to employ a sampling gate comprising a number of series-parallel connected diodes combined with an integrator or capacitor and operational amplifiers and feedback circuits. By means of pulse generator circuitry, the diode gate is first switched on for a very short sampling or "on" time during which the capacitor is intended to assume the input signal value, then the gate is switched off and the capacitor is intended to hold the input signal value at the "off" time. If the signal value at the time of the next sample is substantially different, the capacitor must assume the different value within the short sampling time. The very high gain operational amplifiers and feedback circuits are employed to improve the signal-value-assuming capability of the sampling circuitry and thereby to shorten the sampling interval required. However, the circuitry as a whole is thereby rendered more complex and costly.

It is an overall object of this invention to provide an improved correlator in which both the sampling and multiplier circuitry can be greatly simplified, and hence rendered less costly, generally by providing means for removing potentially undesirable effects of simplified circuitry and mode of operation, rather than to provide means to prevent introduction of such effects initially.

A correlator according to this invention comprises first and second sampling means to which the input signals are applied, each sampling means including an on-off switching device with a sample storage condenser coupled thereto, and operable in on state to vary the condenser voltage in accordance with variations in the applied input signal and in off state to hold the instantaneous condenser voltage at the moment of switching to such off state. Timing control means operate to switch the devices for recurringly sampling the input signals and include means for varying relative timing of sampling of the signals to derive different delay times between samples thereof. Generator means responsive to the sampling means generates recurring product pulses having amplitude-duration pulse envelopes proportional in area to products of signal samples recurringly held on said condensers. (The words "proportional to" as used herein are not limited to direct or linear proportionality, but indicate only a consistent sense or direction relationship.) Averaging means responsive to the generator means average the product pulse output thereof to derive the correlation function. In one form of the invention, high-pass filter means interposed between the sampling means and the generator means, serve to remove low frequency signal components resulting from nonlinearities in the sampling means and from the finite sampling rates and averaging time of the correlator. Such signal components would otherwise swamp or distort the output correlation signal upon passing through the multiplier and would not be removed from the product waveform by being averaged to a constant value in the averaging circuit.

In another form of the invention the aforementioned generator means includes a circuit having dual outputs, the averaging means having corresponding dual inputs and outputs, and is operable to generate in the averaging means outputs a differential output voltage characterized by absence of voltage components proportional to either of the input signals alone and components due to circuit constants normally subjecting the output voltage to drift and other errors. Prior attempts to eliminate such problems have included a conventional push-pull type circuit, wherein the amount of circuitry is virtually doubled in an effort to cancel out unwanted voltage components. In the present system the increase in circuitry is minimal and the elimination of undesired voltage components is more complete.

In still another form of the invention a combination of the above techniques is utilized wherein the generator means includes an auxiliary cancellation channel operable to generate a cancellation voltage which eliminates from the output voltage the component proportional to one of the input signals and, in addition, components due to certain circuit constants. This feature makes the correlator output insusceptible to drifts in certain portions of the product generator circuitry, and output voltage ripple due to finite sampling frequency in one input channel is reduced. High-pass filter means in the other input channel between the sampling means and the generator means is utilized to eliminate small D-C and low frequency components arising in this channel due to the finite sampling rate and averaging time constant. The invention further resides in certain improved electronic circuitry employed in the above combinations.

The sampling technique employed herein utilizes a simplified gate circuit similar to that described in my above-mentioned copending application, including a four-diode bridge controlling the voltage on a sampling capacitor. The bridge itself is adapted to be switched virtually instantaneously between on and off states by switching control voltages applied to very simple control circuitry. The bridge is switched to its on or "open" state for a period which is long compared to the time constant of the gate circuit as a whole (including the sampling capacitor). This permits the capacitor to assume and follow the input signal value, and due to the balanced form and low forward-to-reverse impedance ratio of the gate circuit the capacitor is enabled to follow very high frequency signals with extreme accuracy or accurately known phase shift. The control circuitry is then actuated to switch the bridge off at the appropriate sampling time, thereby "freezing" the voltage value of the capacitor at the input signal value as of the instant of switching. Since the capacitor voltage is not changed when off switching occurs, and since the form of the bridge circuit forces this operation to completion in a matter of nanoseconds, greater timing accuracy and therefore greater sampling accuracy is assured than heretofore possible.

When correlation coefficients are sought at large delay values, the sampling rate is thereby reduced with respect to the time constant of the output averaging circuit, which tends to increase any factor of measurement instability in the output signal over that existing for smaller delay values. According to the invention a double sampling technique is employed, whereby in one input channel an additional or secondary sampling means is provided for shifting to itself the sample held in the primary sampling means which is thereby relieved of its "hold" function in order to resample the input signal during the "hold" interval of the secondary sampling means. As compared to the more straightforward single sampling technique this feature doubles the maximum delay value obtainable, and doubles the maximum pulse-duration permissible, which doubles the output voltage and minimizes the effect of undesirable circuit drifts.

When analyzing high frequency input signals the sampling gate "on" interval or "follow" time may, according to this invention, extend for many cycles of the input signal, so that the sampling rate is much less than the highest frequency component. This technique appears initially to violate a well-known sampling theorem which holds that in order for the information contained in a signal to be reproduced accurately by periodic (constant rate) sampling, the sampling rate must be at least equal to twice the highest frequency of significance in the signal. It can be shown that individual correlation coefficients can be measured with low sampling rates without violating this theorem. But to obtain full correlation information it is necessary that the complete correlation curve be defined at intervals which are no greater than the reciprocal of twice the highest frequency. The present invention takes advantage of the fact that while individual correlation coefficients are measured at low sampling rates, slight changes in delay parameter $\tau$ (necessary to measure different correlation coefficients) make the sampling nonperiodic, which, it can be shown, increases the effective sampling rate so that the theorem is not in fact violated.

Accordingly, the aforementioned averaging means comprises an RC filter circuit having a time constant long relative to the period of sampling of either input signal, and therefore relative to the period of the product waveform, to assure adequate measurement stability by averaging a high number of sample products during all periods equal to its time constant. Yet the averaging filter is maintained in a saturated mode and is operated for periods much longer than its time constant, whereby to act as a true averager, rather than being discharged periodically within its time constant to act as an integrator.

It has often been the practice in the art to integrate the product signal and to provide means for dividing by the integration period to obtain the average called for by the correlation formula. In analog correlators it has been recognized that the division step need only amount to assuring that the same length of time for integration is utilized for each correlation coefficient measurement. For this reason it has become customary to use the words "averaging" and "integrating" interchangeably, even though integration is intended.

Integration (and division) can be performed to obtain correlation measurements in the combination of this invention. However, the preferred embodiments use a true averager, that is the operation of an RC filter circuit in a true averaging mode to perform the averaging step in the correlation computation. In this manner a continuous D-C level output reading is obtained from the correlator without the bothersome step of periodically reading out an integrator summation for each correlation coefficient measurement.

In addition the invention provides improved means associated with the averaging circuit for establishing a stabilized reference level for the product waveform entering the averaging circuit. This means generally comprises an adjustable D-C restoring circuit coupled to both the input and the base terminal of the averaging circuit. It first includes capacitor means coupling the input terminal of the averaging circuit to the generator means output. An adjustable reference voltage source is provided having voltage limits for the product waveform. A unidirectional current flow device is connected between the averaging circuit input (and the coupling means) and the reference voltage source to prevent voltage traversal of the product waveform beyond the reference level set by the source. Finally, it includes means coupling said source to the base terminal of the averaging circuit.

The overall performance of a correlator of the sampling type is greatly affected by the sample storage capacitors and the associated sampling circuitry. For example, the size of the capacitor determines the amount of phase shift present between the input and output of the sampling circuit and hence the phase lag involved in taking samples. Since the amount of phase shift is of greater importance when high frequency input signals are analyzed, capacitor size is determined somewhat by the amount of phase shift tolerable in the frequency range to be handled by the instrument. A number of different capacitors may be provided to be switched into the sampling gate circuit individually for different operating frequency ranges, but this requires more equipment and involves greater expense and inconvenience. Moreover, according to established techniques each capacitor must still hold the sample value essentially constant during the multiplying period, during which its value it utilized to generate the required product waveform. Thus conflicting requirements dictate that the capacitor be of maximum size for minimum leakage (decay) during the hold time, yet it must be of minimum size for short charging time and minimum phase lag.

Both phase lag and leakage rate are influenced, of course, by the relative impedances of the circuits surrounding the sampling capacitor. Phase lag depends somewhat upon forward impedance of the gate circuit and output impedance of the input circuit, and leakage rate is determined to some extent by back impedance of the gate circuit and input impedance of the circuit into which the sampling gate feeds, as well as upon the size of the storage capacitor. Phase compensating circuits can be employed to permit use of higher capacitance to reduce leakage and permit the gate circuit to be of lower quality in general. To improve leakage qualities, a very high impedance vacuum tube cathode follower output circuit can be used. However the cost of compensating circuits is high and would be justified only in a large (multichannel) instrument, and vacuum tube output circuits are accompanied by power supply, space and heating problems. Moreover, even if the overall quality of the sampling gate circuitry were improved by providing optimum impedance matching conditions, greater hold or storage times may still be desired at high frequencies. Hence maximum hold times must be obtainable, which requires large capacitance, so that performance is sacrificed terms of phase lag and sampling accuracy.

A correlator circuit is therefore needed in which larger sample voltage decay rates can be tolerated, so that smaller capacitors can be used, thus imposing smaller amounts of phase lag and permitting more accurate sampling of high frequency input signals, while obtaining longer hold times. Such a circuit could be simpler and less expensive because lower impedance-matching qualities would be required in the sampling circuitry.

An object of this invention is to provide such a correlator, in which sampling and multiplying techniques impose less stringent requirements in terms of phase lag, impedance-matching and sample decay rate, by eliminating the requirement that input signal samples must be held constant during the multiplying period. In fact, the samples are permitted to experience a significant amount of decay during their hold time, thus allowing longer hold and delay times and yet greater accuracy because of the smaller size of sampling capacitors and for other reasons.

A related object is to provide a correlator operable over a wider frequency range while eliminating the requirement for provision of different capacitor values operable in different frequency ranges.

The multiplier technique provided constitutes an improvement in the so-called pulse-width, pulse-height type of multiplier commonly employed in sampling correlators whereby a square wave is generated comprising a train of product pulses having widths (durations) proportional to samples of one input signal and amplitudes proportional to samples of the other input signal. In the particular form of this type of multiplier described in my copending application Ser. No. 256,187 mentioned above, the pulse durations are obtained by recurringly adding together a repeating sawtooth waveform and successive signal sample voltages, comparing the sum to a threshold level, and generating a trigger pulse when coincidence occurs between the sum and the threshold level. Those skilled in the art will recognize that more simplified circuitry may be employed, where a lesser degree of certainty in the correlation measurement may be tolerated, by utilizing coarsely sampled or quantized representations of the input signals.

According to the present invention input signal sample voltages are permitted to decay appreciably during the multiplying interval, yet the general pulse-width, pulse-height multiplication technique is employed to generate a series of product pulses which are ultimately averaged in the output of the correlator. In order to generate product pulses having amplitude-duration envelopes (areas) proportional to products of recurring pairs of samples, means are provided for compensating in terms of the product pulse area for the fact that the samples decay from their initial values according to predetermined decay functions. In place of a sawtooth waveform normally combined with one of the sample voltages during each cycle to obtain pulse-width modulation, a special sweep voltage is employed which is shaped to compensate in product pulse area for the decay of both sample voltages.

In the embodiment illustrated the sample voltages decay exponentially. The product pulse amplitude is proportional to one of the decaying sample voltages and the pulse duration is determined by combining the other decaying sample voltage with an exponential sweep voltage waveform whose shape is related to the time constants of exponential decay of both sample voltages. The sweep voltage generator includes means for modifying a square wave according to a first exponential function, means for generating a sawtooth wave and modifying it according to a second exponential function, and means for adding the two exponentially modified waveforms to produce a composite exponential sweep voltage waveform. In the preferred form of the invention this waveform is added to one of the input signal samples and the sum compared to a reference circuit value, and a timing trigger pulse is generated when amplitude coincidence of the sum and the reference level occurs. This timing trigger pulse determines the width (duration) of the product pulse whose amplitude decays corresponding to the exponential decay of the other input signal. By virtue of the special shape of the exponential sweep voltage waveform the pulse area is proportional to the product of the two samples.

The invention also includes other novel features described hereinafter designed to implement and facilitate the incorporation of the novel sampling and multiplying techniques in a time correlation computer. The resulting correlator is characterized by numerous advantages in terms of speed, accuracy and simplicity not heretofore possible in time correlation computers, as will be more apparent from the following more detailed description of the invention taken in connection with the accompanying drawings illustrating preferred forms thereof.

Figure 1:
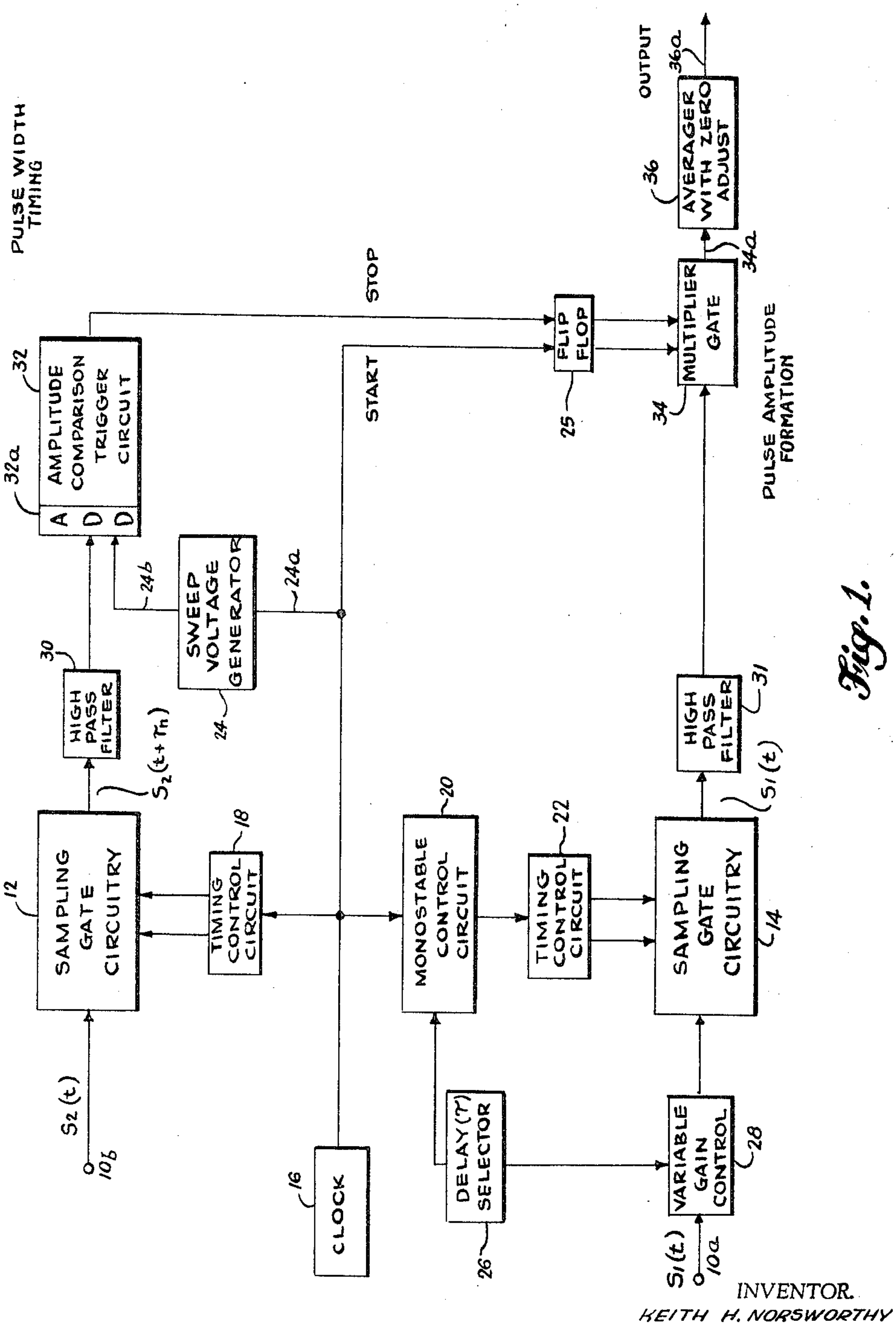
FIGURE 1 is a block diagram of a time correlation computer comprising one embodiment of the invention utilizing a single sample gate in each input channel and having interposed high-pass filters for eliminating certain undesired output voltage components.

In general, the correlator of FIGURE 1 performs three functions common to correlators of this type, namely, sampling one of the input signals at spaced intervals of time, sampling the other input signal at spaced intervals of time delayed from samplings of the first signal, multiplying individual samples of one signal by corresponding individual samples of the other, and obtaining the average of the resulting products as a measurement of the correlation coefficient for the particular delay time between the samples. In the present case the delay time is varied either stepwise or continuously for computing sequentially a number of correlation coefficients for different delay times, thereby generating the correlation function, or in the alternative a number of correlation coefficients are computed simultaneously in different instrument channels to give a composite representation of the correlation function of the signals, as described in the above-mentioned copending application Ser. No. 256,187.

Figure 6:
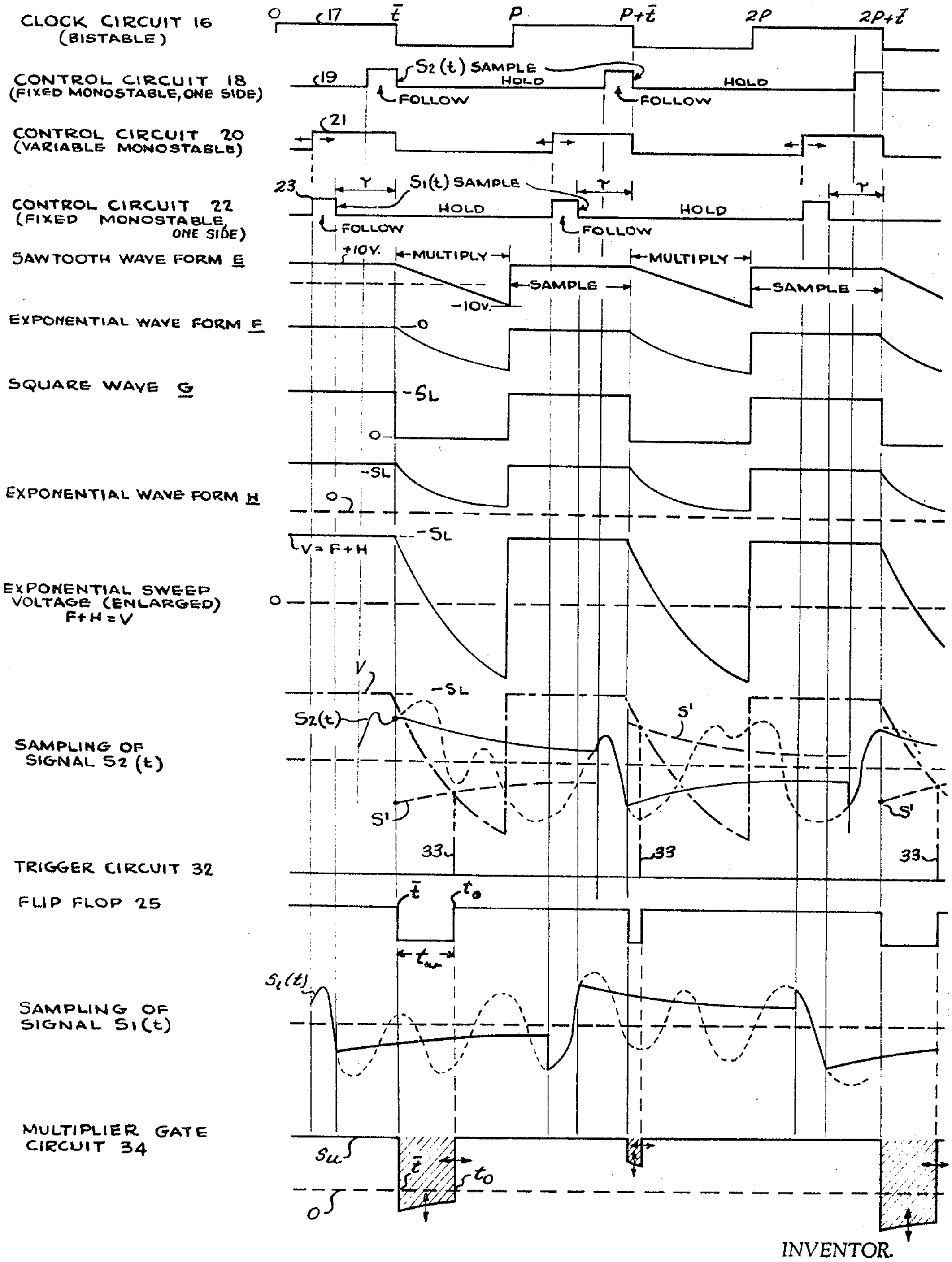
FIGURE 6 is a timing diagram illustrating input and output waveforms of some of the foregoing circuits when the technique of multiplying exponentially decaying samples according to the invention is employed.

In the single channel form in which the invention is illustrated in FIGURE 1, input signals $S_1(t)$ and $S_2(t)$ are applied through inputs 10*a* and 10*b* to sampling gate circuits 14 and 12, respectively. Coordinative timing circuitry includes a clock circuit 16 comprising a bistable or "flip-flop" circuit of high stability generating a basic timing square wave 17 (FIGURE 6) preferably having equally spaced positive- and negative-going edges. The timing square wave is applied to timing control circuit 18 comprising a D-C-controlled fixed monostable circuit triggered recurringly from a first state to a second state by the negative-going edge of the timing square wave and returning to its first state after a fixed amount of time to be retriggered by the next negative-going square wave edge, thereby producing in dual outputs two square waves of opposite phasing, one of which (19) is shown in FIGURE 6. These waves control operation of sampling gate circuit 12, switching the same alternately between on and off states as hereinafter described.

The clock circuit output waveform 17 is also applied to a variable monostable control circuit 20 triggered recurringly from a first state to a second state by the negative-going side of timing square wave 17, and returning to its first state after a variable amount of time controlled by delay selector 26. The latter comprises any suitable means operative upon the monostable circuit to vary the return time thereof, such as a resistance selection switch or variable potentiometer. The square wave 21 (FIGURE 6) produced by this circuit has negative-going edges coinciding with those of timing square wave 17 and positive-going edges occurring at times during the cycle determined by the amount of delay $\tau$ selected. In this embodiment, employing only single sampling, the return time can be varied between a minimum equal to half of the period of the timing square wave and a maximum equal to the return time of fixed monostable control circuit 18, for reasons which will presently become obvious. This output square wave 21 of selectable mark-space ratio is supplied to timing control circuit 22 which, like timing control circuit 18, comprises a D-C-controlled fixed monostable and is triggered recurringly by the variably timed positive-going return edge of the square wave output 21 of control monostable 20. It produces in dual outputs two square waves of opposite phasing one of which (23) is shown in FIGURE 6, for controlling action of sampling gate circuit 14. Each sampling circuit is triggered to sample the applied input signal by the negative-going edge of the control voltage shown. Thus sampling circuit 14 is triggered in each cycle to sample signal $S_1(t)$ out of phase with and in advance of triggering of sampling circuit 12, so that samples of signal $S_2(t)$ are delayed with respect to samples of signal $S_1(t)$ by an amount $\tau$ established by selector 26.

A variable gain control circuit 28 is shown interposed in input 10*a* for varying the gain therein corresponding to variations in delay time $\tau$. This circuit is optional, but can be used when the correlator incorporates the exponential multiplier technique hereinafter described, wherein the overall gain of the correlator is a function of the amount of delay between input signal samples.

Figure 2:
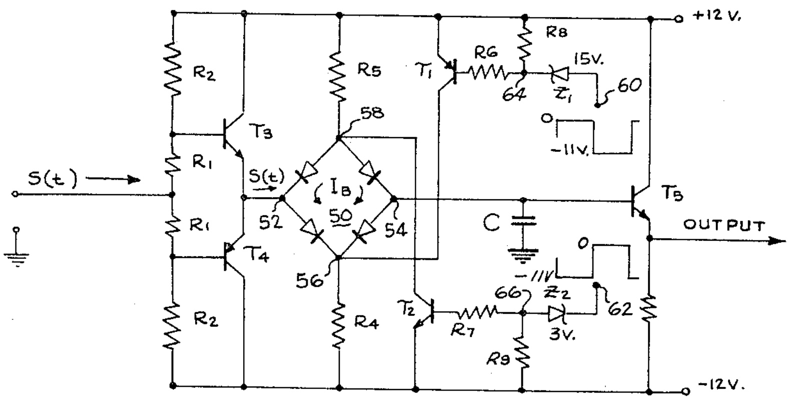
FIGURE 2 is a schematic circuit diagram of novel sampling gate circuitry.

Sampling gate circuits 12 and 14 are of the "follow and hold" type whereby during each operation cycle each gate is switched open for a time sufficient to permit its sample storage capacitor to assume and follow (track) the varying value of the input signal, then is switched off substantially instantaneously so that the value of the input signal at the off-switching time is held on the storage capacitor. Such a gate circuit, illustrated in FIGURE 2, consists mainly of a diode bridge 50 switched alternately to on and off states by square wave switching voltages of opposite phasing applied by the timing control circuit to control transistors $T_1$ and $T_2$. The circuit includes an input stage consisting of transistors $T_3$ and $T_4$ connected to form an emitter-follower, push-pull low impedance drive circuit. Values of resistors $R_1$ and chosen to set the transistors in conduction state and balance their input impedances, while resistors $R_2$ are connected between the respective transistor base terminals and voltage sources of +12 and −12 volts (not shown) to establish appropriate collector-to-base operating voltages.

The four-diode bridge 50 has input terminal 52 connected to the emitter-follower input stage, and output terminal 54 connected to the sample storage capacitor C and to an output transistor $T_5$. Switching terminals 56 and 58 are connected through resistors $R_4$ and $R_5$ to the voltage sources of −12 and +12 volts, respectively. Also connected to these switching terminals are the collectors of control transistors $T_1$ and $T_2$ whose emitters are respectively connected to the +12- and −12-volt sources, respectively. The oppositely phased switching voltages are applied to the bases of these transistors through terminals 60 and 62 connected to dual outputs of a timing control circuit (FIGURE 1) producing the square waves shown. Control terminal 60 is connected to the base of a 15-volt Zener diode $Z_1$ whose plate terminal 64 is connected to the base of control transistor $T_1$ through resistor $R_6$ and to the +12 volt source through resistor $R_8$. Control terminal 62 is connected to the plate terminal of a 3-volt Zener diode $Z_2$ whose base terminal 66 is connected to the base of control transistor $T_2$ through resistor $R_7$ and to the −12 volt source through resistor $R_9$.

In the illustrated case the switching voltage applied to terminal 60 is zero while that applied to terminal 62 is −11 volts. In this condition the voltage across the 15-volt Zener $Z_1$ is approximately 12 volts, which is less than its breakdown voltage so that no current flows therein.

The base of transistor $T_1$ is therefore at substantially the same voltage as its emitter so that no base-to-emitter current flows, and consequently substantially no collector current flows to bridge control terminal 56. At the same time the voltage across 3-volt Zener $Z_2$ is approximately one volt, which is less than its breakdown voltage; hence no current flows in it. The base of transistor $T_2$ is therefore at substantially the same voltage as its emitter (−12 volts) and no current flows therein, which also means that substantially no collector current flows from bridge control terminal 58. Consequently control transistors $T_1$ and $T_2$ appear substantially as open circuits so that the bridge is forward biased and bridge current $I_B$ flows in the diodes.

In this conduction state bridge current $I_B$ is controlled by input signal S(*t*) whose voltage value, applied through the input driving stage to terminal 52, is also sought by the output terminal 54 of the bridge because of the balanced form thereof. Because of its double-end form, the gate circuit is capable of following both positive and negative signal excursions, and due to its extremely low input and forward impedance it is capable of following extremely high frequency signals. According to this invention, the time for which the gate is held open or "on", i.e., the "follow" time set by the control voltage waveform (see FIGURE 6), is made long compared to the time constant of the storage capacitor C in its output. During this time the capacitor voltage follows very accurately (or with precisely known phase relationship) the input signal voltage applied to the gate.

When the control voltages applied to terminal 60 and 62 are switched to −11 volts and zero volt, respectively, the voltage across 15-volt Zener $Z_1$ is approximately 23 volts so that it breaks down and its plate terminal 64 assumes a voltage of about +3 volts. Current then flows in the base circuit of transistor $T_1$, causing high current flow in its collector circuit and thereby rendering bridge terminal 56 positive—at approximately +11 volts. At the same time Zener $Z_2$ breaks down so that current flows in the base circuit of transistor $T_2$ and hence in its collector circuit whereby switching terminal 58 of the bridge is rendered negative—at approximately −11 volts. The bridge is thus back-biased by essentially short-circuiting its control terminals to the D-C-voltage sources, so that no bridge current $I_B$ flows.

Because of the very high speed with which the control transistors can be switched from nonconducting to conducting state and because of the high current conduction state into which they are driven, the bridge switching time can be made extremely short—of the order of nanoseconds. Since the capacitor voltage does not have to change in this time period, but is merely "frozen" at its instantaneous value, rapidly varying signals can be sampled accurately. Yet the sampling circuit and its control circuitry are quite simple.

The purpose of high-pass filters 30 and 31 interposed between gate circuits 12 and 14 and the multiplying circuitry will be explained hereinafter.

The illustrated circuitry for multiplying the recurring pairs of sample voltages comprises different embodiments, all related to the pulse-width, pulse-height technique described in the previously mentioned copending applications, and one particularly designed to implement the technique for multiplying decaying sample voltages. According to the first embodiment, samples of signal $S_1(t)$ are applied through high-pass filter 31 to multiplier gate circuit 34 comprising an electronic gate of suitable type adapted to be switched alternately between on and off states by flip-flop circuit 25. During its on state its output is proportional to the input signal sample voltage in gate circuit 14, and when in its off state its output is clamped to a reference level $S_u$ greater than the most positive value of signal $S_1(t)$, thus producing a series of negative-going output pulses having amplitudes linearly related to the $S_1(t)$ samples stored in sampling gate 14, according to the following formula:

$$\text{Pulse height} = A + K_1 S_1(t) \qquad (1)$$

where A is a constant equal to $S_u$ and $K_1$ is a negative constant.

Samples of signal $S_2(t)$ are applied through high-pass filter 30 to amplitude comparison circuit 32 having an input addition stage **32*a* to which the output of sweep voltage generator 24 is also applied. Sweep voltage generator 24, responsive to the timing control square wave output of the clock circuit, comprises a suitable clamper circuit operable during the "positive" half of the clock circuit cycle to clamp the output voltage at a voltage greater than the maximum value of the $S_2(t)$ sample, and an integrator triggered by negative-going sides of recurring timing square wave impulses to integrate the "negative" half thereof, resulting in sawtooth waveform E shown in FIGURE 6. Each triangular sweep voltage begins simultaneously with switching of gate circuit 12 to its off or hold state and ends prior to sampling by sampling circuit 14 at the greatest delay time $\tau$ available on selector 26**.

This sawtooth wave and the $S_2(t)$ sample voltage are added in the trigger circuit addition stage **32*a* and the sum is compared to a reference voltage (zero volt), the trigger circuit producing an output trigger pulse when the sum becomes equal to that reference voltage. The output trigger pulse is applied to one input of flip-flop circuit 25. Applied to the other input thereof is the timing control square wave output of clock circuit 16. Flip-flop 25, suitably controlling gate circuit 34 such as by oppositely phased dual output square waves, recurringly switches the same to its on state in response to negative-going edges of the timing square wave, and switches it off in response to terminating trigger pulses of trigger circuit 32. Since the latter occur after times related to values of $S_2(t)$ samples, recurring output pulses of the multiplier gate 34** have durations linearly related to successive samples of signal $S_2(t)$ according to the following formula:

$$\text{Pulse length} = B + K_2 S_2(t) \qquad (2)$$

where B and $K_2$ are constants. These product pulses whose amplitudes are given by Equation 1 are ultimately averaged to form the correlation coefficient output signal.

Before describing other embodiments of the multiplier according to the invention, the system function of high-pass filters 30 and 31 will now be explained. The magnitude-time "areas" of the product pulses are given as follows:

$$\text{Pulse area} = AB + K_1K_2S_1S_2 + BK_1S_1 + AK_2S_2 \qquad (3)$$

where $S_1$ and $S_2$ are stored sample values of signals $S_1(t)$ and $S_2(t)$. The desired product term is, of course, the second one, $K_1K_2S_1S_2$. The first term averages to a constant value and hence can be eliminated easily from the output. The requirement that the remaining two terms $BK_1S_1$ and $AB_2S_2$ average to constant values or to zero normally is taken care of by the assumption that when sampled a sufficient number of times over a sufficiently long averaging period, the mean values of $S_1$ and $S_2$ are zero. However, it is inevitable as a statistical matter that errors will be introduced by this assumption, since the averaging period and the sampling rate are both finite. Because of these last two terms, even small D-C and low frequency components due to finite sampling rates and averaging time will very quickly mask the desired signal corresponding to the product (second) term. The result is that the output signal is distorted by unknown amounts varying with values of signals $S_1(t)$ and $S_2(t)$ regardless of the amount of correlation therebetween.

According to this embodiment of the invention, therefore, high-pass filters 30 and 31 are interposed in the sampling circuit outputs to eliminate such undesirable signal components, thereby eliminating output signal values due to the third and fourth terms of Equation 3.

The high-pass filters have a second important purpose, namely to permit the relatively extreme simplicity which characterizes the sampling circuitry. Interposed as A-C coupling between the sampling gates and the multiplying circuitry, they serve to remove D-C and low frequency components resulting from nonlinearities in the simplified sampling circuits. Errors due to such nonlinearities would again be emphasized because of the third and fourth terms of Equation 3, since the mean values of signals of $S_1(t)$ and $S_2(t)$ are thereby caused to deviate from zero. Removal of the resulting undesired signal components by the high-pass filters obviates necessity for provision of elaborate feedback and operational amplifier circuits to avoid introduction of this type of error, while further distortion of the correlation output is prevented.

In a second embodiment of the system the sample storage capacitors have values whereby during multiplying intervals of recurring cycles the sample voltages are permitted to decay toward predetermined reference voltages, as illustrated in FIGURE 6, in order to permit greater simplicity in the overall circuitry as previously explained. The system utilizes a pulse-width, pulse-height technique similar to that just described to generate a product waveform comprising recurring pulses having amplitude-duration pulse envelopes related to the product of initial values of recurring pairs of decaying sample voltages. For simplicity, pulse amplitudes are directly related solely to the exponentially decaying $S_1(t)$ sample voltage, and pulse durations are determined by means compensating in terms of pulse envelope area for the decay of both sample voltages. The compensation is effected by generating a recurring sweep voltage V, modified from the usual triangular waveform, which when combined with the decaying $S_2(t)$ sample establishes a cutoff trigger time $t_0$ such that the product pulse width (duration) $t_w$ compensates in pulse area for decay of the sample values of both $S_1(t)$ and $S_2(t)$. Actually, in the illustrated case the sample voltages are assumed to decay exponentially, since in that case, as can be shown, the compensating cutoff trigger time $t_0$ need only be related to the $S_2(t)$ sample, whereas if the sample voltages are known to decay according to more complex functions, $t_0$ must be a function of initial values of both $S_1(t)$ and $S_2(t)$ samples.

Figure 5:
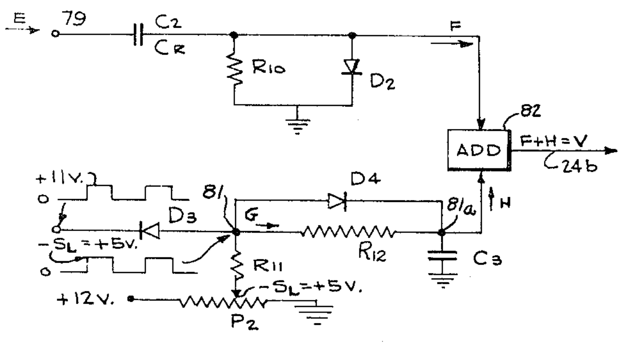
FIGURE 5 is a schematic circuit diagram of the exponential sweep circuit in the generator of FIGURE 4.

Under the above assumption the exponentially decaying sample voltages at any instant $t$ are:

$$S_1'=S_1e^{\frac{-(t-\bar{t}+)\tau}{T_1}} \qquad (4)$$

$$S_2'=S_2e^{\frac{-(t-\bar{t})}{T_2}} \qquad (5)$$

where $S_1$ and $S_2$ are initial values of samples of signals $S_1(t)$ and $S_2(t)$, respectively, and $T_1$ and $T_2$ are the decay time constants corresponding to the respective sampling circuits. It can be shown that the duration $t_w$ of the product pulse must be:

$$t_w=t_0-\bar{t}=T_1 \log_e (K_3S_2+K_4) \qquad (6)$$

where $\bar{t}$ is the starting time for each product pulse and $K_3$ and $K_4$ are constants. Further, it can be shown for the timing illustrated in FIGURE 6, where the $S_1(t)$ sample is taken at time $\bar{t}-\tau$ and the $S_2(t)$ sample at $\bar{t}$, the modified sweep voltage V is given as follows:

$$V=kt\left(1\frac{t}{2T}+\frac{t^2}{7.7T^2}-\frac{t^3}{43T^3}\right)-S_Le^{\frac{-t_w}{3T}} \qquad (7)$$

$$V=F+H \qquad (8)$$

where $k$ is a constant, $S_L$ is the lowest value assumed by the sampling capacitor in sampling circuit 12, corresponding to the smallest duration output product pulse, and $T=T'/3$, where $T'=T_1=T_2$, assuming for simplicity that the decay constants are equal. The two terms of this equation are generated to a close approximation in the upper and lower parts, respectively, of the circuit shown in FIGURE 5, wherein circuit values are determined according to the above equation and according to corresponding circuit values in the sampling circuits, as will be recognized by those skilled in the art.

Figure 4:
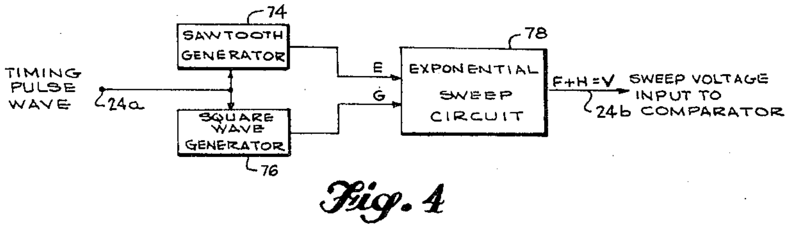
FIGURE 4 is a block diagram of an exponential sweep voltage generator for employment in the correlator of FIGURE 1 when utilizing the technique provided according to the invention for multiplying samples experiencing significant exponential decay.

Timing square wave 17 is applied through input 24a (FIGURE 4) to a sawtooth generator 74 of a suitable type for generating sawtooth waveform E (FIGURE 6), such as that described in the embodiment previously discussed. Sawtooth wave E is applied through input 79 (FIGURE 5) to capacitor $C_2$ to which are connected a resistor $R_{10}$ and a diode $D_2$ having a common connection to ground. This CR network exponentially modifies sawtooth wave E to produce waveform F (FIGURE 6) of negative-going sweep during the multiplying portion of the cycle and clamped at 0 volt by the diode during the sampling portion of the cycle. Waveform F corresponds to the first term in Equation 7.

The timing square wave is also applied to a square wave generator 76 which in this case is simply an adjustable clamper circuit comprising a diode $D_3$ connected to resistor $R_{11}$ which in turn is connected to the wiper of a potentiometer $P_2$ having end terminals connected to ground and a +12-volt source. The square wave is thereby clamped at a value equal to the negative of the lowest value permissible for $S_2(t)$ samples ($-S_L$), which is taken as +5 volts.

The resulting clamped square wave G is applied to input terminal 81 of an RC circuit consisting of resistor $R_{12}$ and capacitor $C_3$ connected to ground. Diode $D_4$ connected across the terminals of resistor $R_{12}$ transfers the aforementioned clamping action to terminal 81a, preventing the output waveform from exceeding the $-S_L$ setting of potentiometer $P_2$. Square wave G is modified by this circuit according to an exponential function to have a maximum (positive) value equal to $-S_L$ and decreasing to a value greater than zero, this waveform corresponding to the second term of Equation 7. Waveforms H and F are then added in adding circuit 82 to form in output 24b the required composite exponential sweep voltage V traversing zero and having maximum and minimum values of greater separation than values traversed by input signal $S_2(t)$.

Sweep voltage V is added in each cycle to the currently held sample of signal $S_2(t)$ in input stage 32a of amplitude comparison trigger pulse 33 when the sum is equal to a threshold level of zero volt. Since this is tantamount to triggering when waveform V is equal to the negative of the decaying $S_2(t)$ sample, coincidence is illustrated by intersection of sweep voltage V with dotted lines S' representing negatives of $S_2(t)$ samples.

The remainder of the circuit operates in the same manner as in the embodiment already discussed. Flip-flop 25 switches multiplier gate circuit 34 on at the same time during each cycle and switches it off at different times in response to the comparison circuit output trigger pulse 33. Because of the modified shape of the sweep voltage, this "off" trigger 33 occurs at times compensating in pulse-duration for the exponential decay of the sample of signal $S_1(t)$, so that the resulting pulse envelopes are linearly related to products of initial values of the recurring pairs of samples. Thus the multiplier output comprises the illustrated train of pulses having exponentially decaying tops (or bottoms, as the case may be).

Sampling and multiplying operations are performed cyclically, while the resulting product waveform is averaged continuously to generate the correlation coefficient. The delay time $\tau$ is varied by selector 26 to generate the correlation function for a plurality of discrete delay times, or it may be operated in cyclic fashion to generate repeatedly the correlation function for a predetermined range of delay times $\tau$. In either case it is the variation of the delay parameter $\tau$ continuously or incrementally which effectively increases the sampling rate, so that even though the sampling rate at a given time is low, the over-all rate during the test period makes the output statistically valid, as previously discussed.

It will be recognized that the function of high-pass filters 30 and 31 is the same in the embodiment including the "exponential multiplier" as in the embodiment first discussed.

It can be seen from the illustration of sampling of signal $S_1(t)$ (FIGURE 6) that sample voltage decay is greater or lesser at product pulse starting time $t$, depending upon the value of delay $\tau$. This fact results in changes in the overall gain of the correlator system with variations in delay time. While a compensating variable gain control 28 (FIGURE 1) responsive to delay time selector 26 may be included in the circuit, it may be preferred, in order to maintain simplicity and flexibility, to disregard this gain variation. The output correlation function signal is thereby attenuated increasingly for increasing delay times according to an exponential function having a time constant equal to the time constant $T_1$ of sampling gate circuit 14. The modified correlation function, of course, carries the same information as the unmodified form thereof.

The overall system gain is also a function of the product rate. When provision is made for varying the output frequency of clock circuit 16 to vary the rate at which samples are taken and multiplications performed, provision is then made for varying the slope of the sweep voltage waveform correspondingly. Gain control means may then be included if desired to compensate for the slight changes in the system gain accompanying variations in the product rate.

Figure 3:
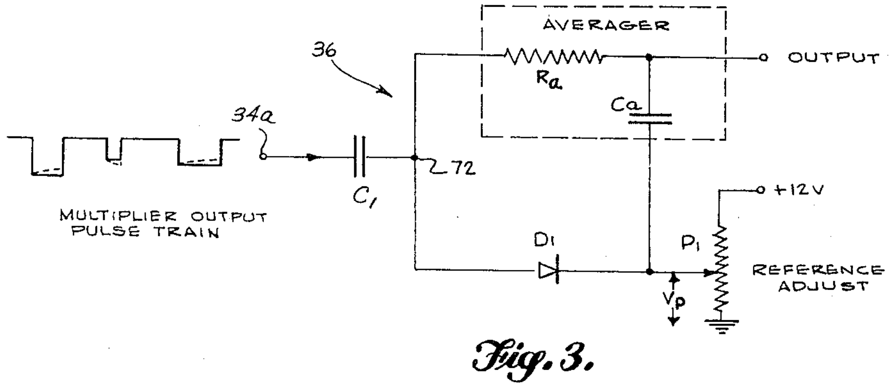
FIGURE 3 is a schematic circuit diagram of the output circuit of the correlator in FIGURE 1, namely an RC averaging circuit and a D-C restoring circuit with zero-adjusting means for stabilizing the reference level of the product waveform input to the RC averaging circuit.

The product waveform output of multiplier gate circuit 34 is applied through terminal 34*a* to the improved output circuit 36 (FIGURE 3), comprising a coupling capacitor $C_1$ an RC averaging circuit consisting of resistance $R_a$ and capacitor $C_a$, and an adjustable D-C restoring circuit employed to stabilize the reference level of the product waveform entering the averager. The restoring circuit comprises diode $D_1$ connected between the coupling capacitor and the base terminal of the averaging circuit capacitor $C_a$. The latter terminal is connected to the wiper of reference-adjusting potentiometer $P_1$ whose terminals extend between ground and a +12-volt D-C source (not shown). The voltage on capacitor $C_1$ (terminal 72) follows the shape of the input product waveform, the capacitor coupling serving to remove drift in the product waveform reference level due to temperature variations and other causes. A new, more stable reference voltage $V_P$ is set at terminal 72 according to the setting of potentiometer $P_1$. Another advantage of the circuit is that because the capacitor base terminal is connected to the potentiometer wiper, zero adjustment can be performed rapidly without involving the time constant of the averaging circuit.

Figure 14:
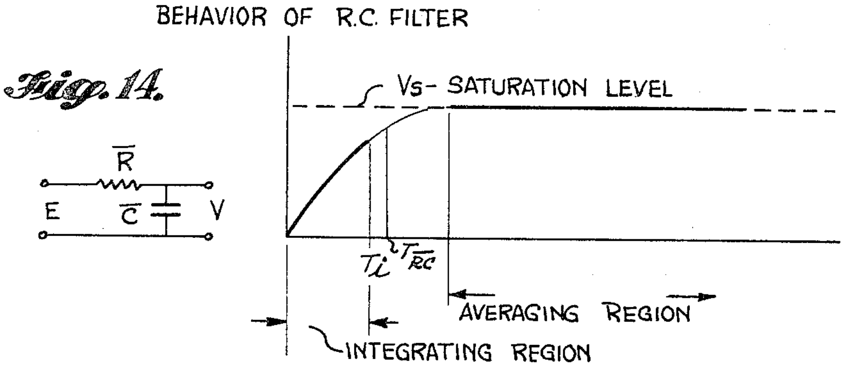
FIGURE 14 is a diagram illustrating the basic mode of operation of the output averaging circuit according to the invention.

As discussed previously, the averager consisting of resistor $R_a$ and capacitor $C_a$ is operated in its saturated mode whereby to function as an averager, rather than an integrator. The distinction is shown in FIGURE 14, wherein the integrating mode of any filter of resistance $\overline{R}$ and capacitance $\overline{C}$ is designated as time 0 to $T_1$, during which the output voltage V rises very linearly in response to a constant input voltage E. During this period, less than the time constant $$T_{\overline{RC}}$$

such a filter acts very nearly as an ideal integrator, and can be used to sum directly a series of voltages applied thereto, such as product pulses from a correlator.

Preferably, according to this invention, the filter is operated in the saturated mode wherein its output voltage takes on the level $V_s$. A large number of product pulses are delivered to the filter during all periods equal to its time constant $$T_{\overline{RC}}$$

but according to this invention operation is continued for much longer periods. It can be shown by well-known mathematical proof that the resulting output voltage at any instant is an average of the discrete input levels delivered during the previous period exceeding the time constant. Thus the delay time controlled by selector 26 is changed at intervals preferably several times greater than $$T_{\overline{RC}}$$

or, when varied continuously, at a rate which assures a stable, continuous average.

Figures 7, 8:
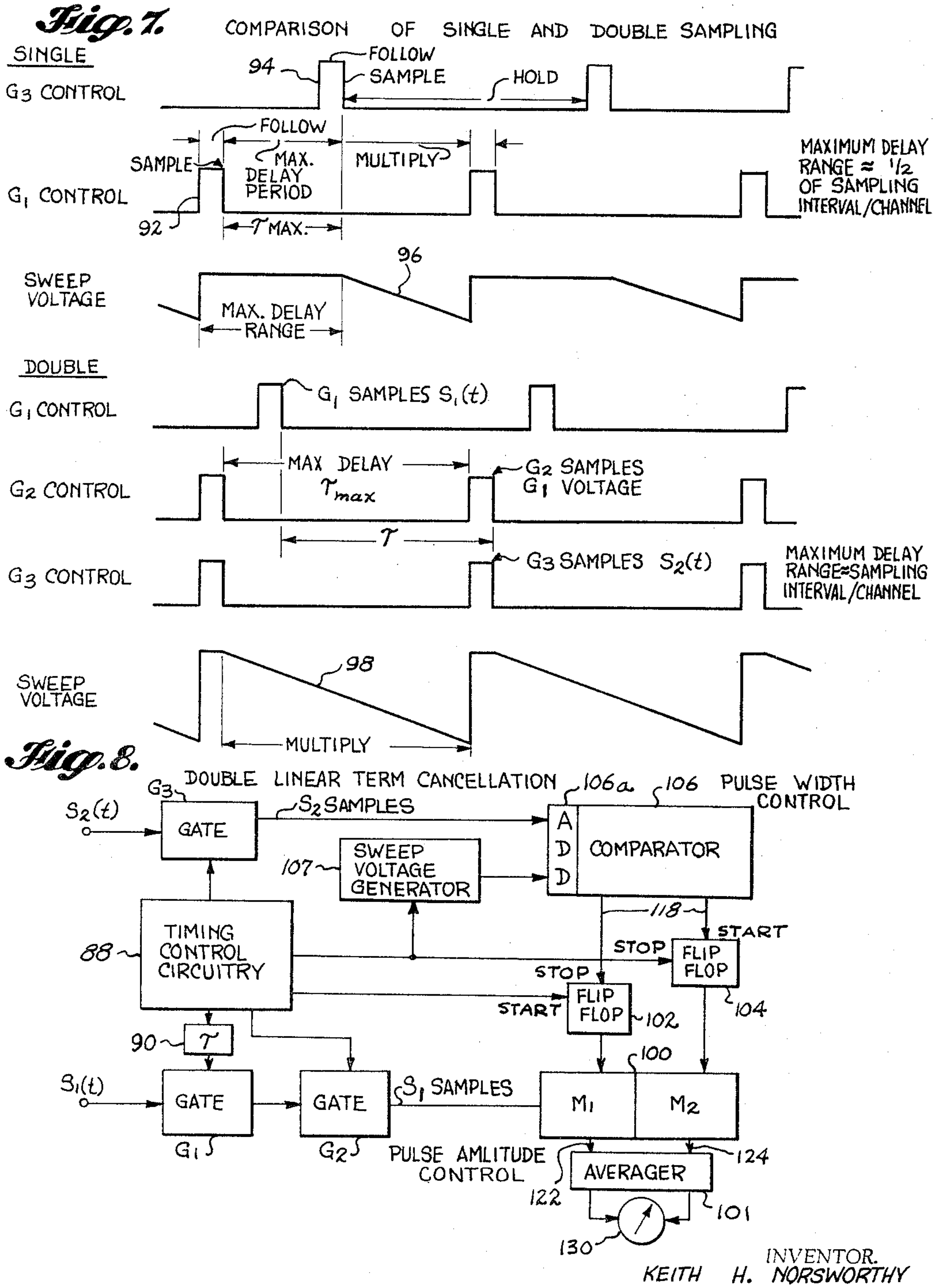
FIGURE 7 is a timing diagram drawing a comparison between single and double sampling techniques.
FIGURE 8 is a block diagram of a time correlation computer comprising a second embodiment of the invention, utilizing double sampling and having dual output channels for deriving a differential output voltage characterized by cancellation of output voltage components linearly related to the rsepective input signals.
Figure 12:
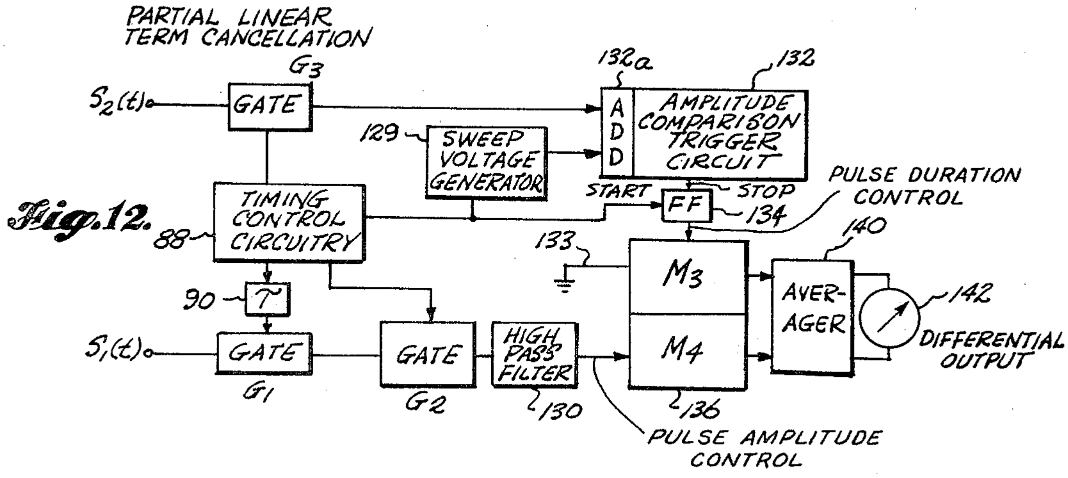
FIGURE 12 is a third embodiment of the invention including means for double sampling, high-pass filters, and an auxiliary output channel, and operable to generate a differential output voltage characterized by cancellation of components linearly related to one of the input signals and components due to certain circuit constants.

In the correlators of FIGURES 8 and 12 the double sampling means comprise gate circuits $G_1$ and $G_2$ in the $S_1(t)$ input channel, while gate circuit $G_3$ samples $S_2(t)$ as before, all according to the timing shown in FIGURE 7 wherein single and double sampling techniques are compared. According to the timing for single sampling (such as is also shown in FIGURE 6) gate circuit $G_2$ is omitted, and gates $G_1$ and $G_3$ sample once during the first half of the instrument cycles as shown by control square waves 92 and 94, their timing being offset by an amount $\tau$ determined by delay control means 90. The sweep voltage comprising sawtooth waveform 96 occupies the other half of the cycle. The maximum delay period ($\tau_{max.}$) is approximately one-half of the sampling interval per channel.

According to timing in the double sampling technique, gate $G_1$ is controlled to sample signal $S_1(t)$ at a time during the instrument cycle controlled by delay selector 90 (FIGURE 8). The second gate circuit $G_2$ is controlled to sample the $S_1(t)$ sample held in gate $G_1$ simultaneously with sampling of signal $S_2(t)$ by gate $G_3$. This relieves gate $G_1$ of its "hold" function, so that it can sample signal $S_1(t)$ at any time prior to the next shift time (sampling by gate $G_2$). Sweep voltage 98, defining the multiplying interval, coincides with the entire storage time of gate circuits $G_2$ and $G_3$, as does the maximum delay period $\tau_{max.}$. Since the multiplying interval is substantially doubled, so is the permissible product pulse duration, thereby doubling the output voltage swing, as well as the maximum delay time. This results in greater measurement stability, particularly for large delay values, since the product rate is effectively higher for the same delay range.

It will be recognized that the double sampling technique can be incorporated easily into the embodiment first discussed, while special provisions would be required to utilize double sampling with storage condensers having high decay rates according to the second embodiment.

In the correlator of FIGURE 8, $S_1$ samples are applied by gate $G_2$ to multiplier gate circuit 100, hereinafter described, having complementary pulse amplitude control stages $M_1$ and $M_2$, each switched alternately between on and off states by flip-flop circuits 102 and 104. These stages are included in dual output channels having output terminals 122 and 124 wherein complementary product pulse trains are generated, the pulses in one increasing and in the other decreasing in size in response to increases in input values. The amplitudes of product pulses in both pulse trains are controlled by $S_1$ samples from gate $G_2$, and the widths in both are controlled by signals in dual outputs of comparator circuit 106 responsive to $S_2$ samples from gate $G_3$.

Samples of signal $S_2(t)$ are applied by gate circuit $G_3$ to amplitude comparator 106 having an input addition stage 106*a* to which the output of sweep voltage generator 107 is also applied. The latter, which is responsive to the timing control circuitry 88, comprises a suitable clamper circuit and an integrator circuit operable to generate a sawtooth waveform such as that shown (98) in FIGURE 7. Each triangular sweep voltage begins simultaneously with switching of gate circuits $G_2$ and $G_3$ to their off or "hold" states and terminates with their subsequent switching to on or "follow" states at the end of the multiply interval.

Figure 9:
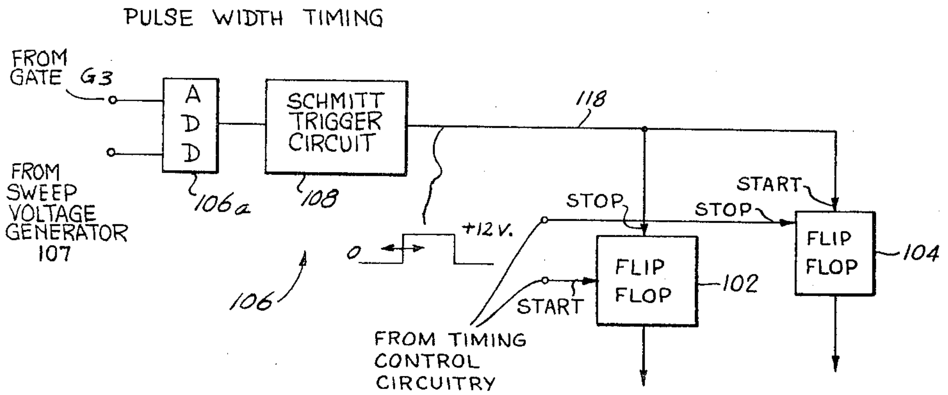
FIGURE 9 is a combined block and schematic diagram illustrating the simplified pulse-width timing circuitry in the embodiment shown in FIGURE 8.

The sawtooth wave and the $S_2$ sample voltage are added in addition stage 106a and the sum is compared to a reference level in Schmitt trigger circuit 108 (FIGURE 9). This circuit shifts from a quiescent output state of zero volt to +12 volts when the input sum becomes equal to the reference level, and is returned to zero volt by termination of the sawtooth waveform. The resultant square wave trigger circuit output of duration proportionally related to the $S_2$ sample is applied to both flip flop circuits 102 and 104 which control operation of multiplier gate circuit 100.

Figure 11:
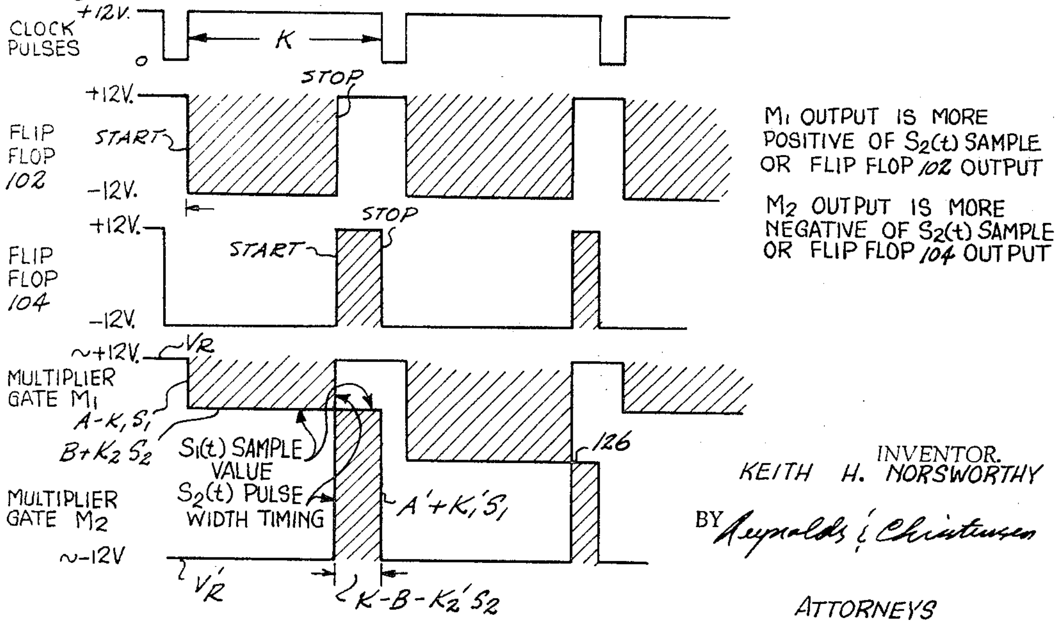
FIGURE 11 is a timing diagram illustrating formation of dual product pulse trains generated in the correlator of FIGURE 8.

As is seen from the flip-flop output waveforms shown in FIGURE 11 pulse duration, control pulses for pulse amplitude control stage $M_1$ (flip-flop 102 output) begin with termination of each clock pulse, i.e., the beginning of each multiply interval, and terminate during the multiply interval at a time controlled by the coincidence output of Schmitt trigger circuit 108. The same coincidence trigger also starts each width control pulse for pulse amplitude control stage $M_2$, which is terminated at the end of the multiply interval by a stop trigger applied to flip-flop 104 by timing control circuit 88.

Thus flip-flops 102 and 104 function to establish precise input voltage commands for the multiplier gate circuit 100. The dual gating stages $M_1$ and $M_2$ of this circuit comprise input transistors $T_7$, $T_9$ and gating transistors $T_8$, $T_{10}$. Voltage samples from gate $G_2$ are applied simultaneously through input 119 to the bases of both transistors $T_7$ and $T_9$. Prior to coincidence, both flip-flop outputs are at −12 volts, so that gating transistors $T_8$ is nonconducting while $T_{10}$ is conducting. In this circumstance transistor $T_7$ applies the $S_1$ sample voltage from gate $G_2$ to the averager input terminal 122, while terminal 124 is clamped to a reference level $V_{R'}$, approximately −12 volts. Upon coincidence, the base voltages of both transistors $T_8$ and $T_{10}$ are abruptly and simultaneously changed to +12 volts, so that the former is conducting and the latter is nonconducting. In this condition, gating transistor $T_9$ applies the $S_1$ sample voltage from gate circuit $G_2$ to averager input terminal 124, while terminal 122 is clamped to a reference level $V_R$, approximately +12 volts.

As shown, the resultant $M_1$ output at terminal 122 comprises negative-going pulses beginning with termination of clock pulses and ending with occurrence of a coincidence trigger, while the $M_2$ output comprises positive-going pulses beginning with occurrence of the coincidence trigger and terminating with beginning of a clock pulse. Since terminal 124 assumes precisely the same value as that previously held by terminal 122 at each occurrence of a coincidence trigger, the two product pulse trains can be drawn with coinciding corners 126. Averaging circuit 101 to which the respective product pulse trains are applied derives a differential average output at terminals 128, which can be read or recorded in a suitable indicator 130 (FIGURE 8).

The following mathematical derivations will show that the very simple complementary output arrangement just described serves to eliminate from the output voltage of the pulse-width, pulse-height multiplier certain undesired terms giving rise to voltages which normally mask the desired product output. Using symbolism similar to that previously used and taking K as the length of the multiplying interval, the $M_1$ pulse dimensions are:

$$M_1 \text{ pulse height} = A - K_1S_1 \quad (9)$$

$$M_1 \text{ pulse width} = B + K_2S_2 \quad (10)$$

where A and B are the zero-input amplitude and width of $M_1$ output pulses and $K_1$ and $K_2$ are positive factors representing circuit gains (all constants), and $S_1$ and $S_2$ are sample voltages.

Accordingly, the averaged output voltage $V_1$ corresponding to the $M_1$ multiplier output is:

$$V_1 = \overline{V_R - (A - K_1S_1)(B + K_2S_2)} \quad (11)$$

where $V_R$ represents the reference voltage as previously noted and the bar represents averaging.

Similarly, the $M_2$ output pulse dimensions are:

$$M_2 \text{ pulse height} = A' + K_{1'}S_1 \quad (12)$$

$$M_2 \text{ pulse width} = K - B - K_{2'}S_2 \quad (13)$$

where A', $K_{1'}$ and $K_{2'}$ are positive constants corresponding to A, $K_1$ and $K_2$ for the $M_2$ half of the circuitry. The averaged $M_2$ product voltage $V_2$ is:

$$V_2 = \overline{V_{R'} + (A' + K_{1'}S_1)(K - B - K_{2'}S_2)} \quad (14)$$

where $V_{R'}$ is the $M_2$ reference voltage as shown. The differential output voltage, then, can be written as:

$$\begin{aligned} V_2 - V_1 = {} & V_{R'} - V_R + A'K + B(A - A') \\ & + (KK_1 - BK_1 - BK_{1'})\overline{S_1} \\ & + (AK_2 - A'K_{2'})\overline{S_2} \\ & - (K_1K_2 + K_{1'}K_{2'})\overline{S_1S_2} \end{aligned} \quad (15)$$

Obviously, the desired term is the $\overline{S_1S_2}$ product term, and the object is to eliminate or make constant or negligible the remaining terms. The first series of constant terms can be eliminated easily by means of a suitable D-C restoring circuit such as that previously described, which would also serve to remove or reduce any drift due to the term A'K. The fact that the output is dependent on K, and thus on the clock circuit mark-space ratio, is normally not a problem, since clock circuits can be made very accurate. It should be noted that A and A' are the heights of the pulses in amplitude control stages $M_1$ and $M_2$ when the inputs are zero. These can easily be made identical to nearly any desirable degree by careful choice of circuit components, so that the term $B(A-A')$ is zero.

Similarly, as to the $\overline{S_1}$ term it is first to be noted that $K=2B$, and that gain factors $K_1$ and $K_{1'}$ can also be made virtually equal by careful selection of circuit values. This is made easier by the fact that the power supply voltages are the same for both halves of the multiplier circuitry and both circuits have the same input. The $\overline{S_1}$ term therefore is zero or negligible. It is important here to note the important advantage that the output voltage is virtually independent of the parameter B, which would change due to drift in the pulse width timing circuitry.

As to the $\overline{S_2}$ term, as previously noted, A is made equal to A'. Further, $K_2$ and $K_{2'}$ because these represent the gain of the same Schmitt trigger circuit.

As to the $\overline{S_1S_2}$ term, in view of the previously mentioned virtual equality of $K_1$ and $K_{1'}$ and the equality of $K_2$ and $K_{2'}$ it is seen that the desired product term is doubled, making less significant any uneliminated drifts caused by other terms.

The differential output provides the added advantage that in-phase drifts present in outputs 122 and 124 will cancel. As will be recognized by those skilled in the art, circuit constants A, A', $K_1$, $K_{1'}$, $K_2$ and $K_{2'}$ can take on negative values, and A and A' can be zero, providing the virtual equalities of A and A' and $|K_1|$ and $|K_{1'}|$ and the equality of $K_2$ and $K_{2'}$ are maintained. If $K_{1'}$ is made virtually equal to $-K_1$, the outputs of the multiplier channels $M_1$ and $M_2$ are summed rather than subtracted. In either case separate averaging circuits can be employed, as can special zero-adjust ouput circuits such as previously described.

Besides the fact that output voltage components linearly related to the respective input signals are cancelled, the circuit is characterized by important insensitivity to the principal sources of drift, both in the width dimension and in the height dimension, all distinct advantages over conventional push-pull techniques sometimes similarly employed.

Figure 13:
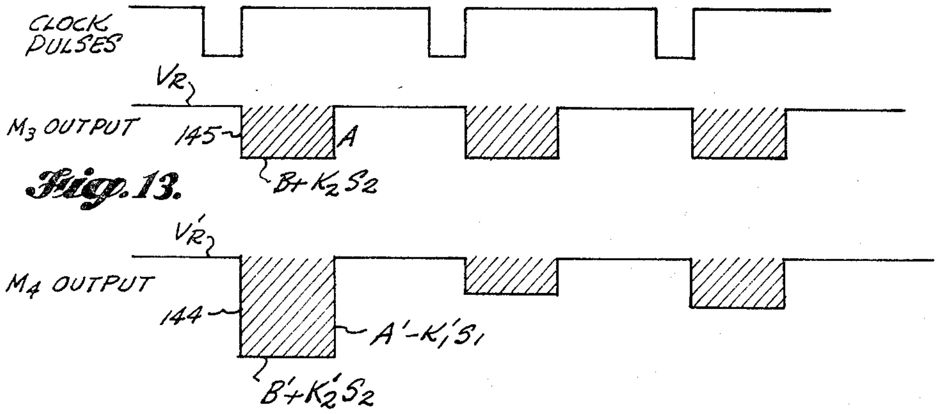
FIGURE 13 is a timing diagram illustrating formation of the product pulse train generated in the correlator in FIGURE 12.

The embodiment illustrated in FIGURE 12 represents a compromise approach having an auxiliary output channel for cancelling output voltage components linearly related to one of the input signals, and interposed high-pass filter means for eliminating drift components related to the other input signal. The input circuitry is essentially identical to that in the embodiment just described, including double sampling gates $G_1$ and $G_2$ in the $S_1(t)$ input channel and gate $G_3$ in the $S_2(t)$ channel, timing control circuitry 88 including delay means 90, and sweep voltage generator 129 triggered by timing control circuitry 88. The amplitude comparison trigger circuit 132 includes, as before, an addition stage 132a and a Schmitt trigger circuit for delivering a stop pulse to control flip-flop 134 in response to coincidence of the sum of the sweep voltage and an $S_2$ sample with a reference level. Flip-flop 134 controls firing of multiplier gate circuit 136 having dual output channels $M_3$ and $M_4$ in which dual trains of pulses having widths related to $S_2$ samples are generated. Pulses 144 (FIGURE 13) generated in stage $M_4$ have heights controlled by $S_1$ samples, but pulses 145 generated in stage $M_3$ have equal heights A corresponding to zero input in the $S_1(t)$ channel, as is schematically indicated by the ground symbol input 133. Using the same symbolism as before for comparison, the $M_3$ and $M_4$ output product pulses have heights and widths given by:

$$M_3 \text{ pulse height}=A \quad (19)$$

$$M_3 \text{ pulse width}=B+K_2S_2 \quad (20)$$

$$M_4 \text{ pulse height}=A'-K_{1'}S_1 \quad (21)$$

$$M_4 \text{ pulse width}=B'+K_2S_2 \quad (22)$$

where A and A′ are zero-input amplitudes and B and B′ are zero-input widths of pulses from $M_3$ and $M_4$, respectively, and $K_{1'}$, $K_2$ and $K_{2'}$ are factors representing circuit gains. Accordingly, the respective output product pulse areas $V_3$ and $V_4$ are given by:

$$V_3=V_R-A(B+K_2S_2)$$
$$=V_R-AB-AK_2S_2 \quad (23)$$
$$V_4={}_{R'}-(A'-K_{1'}S_1)(B'+K_{2'}S_2)$$
$$=V_{R'}-A'B'+B'K_{1'}S_1-A'K_{2'}S_2+K_{1'}K_{2'}S_1S_2 \quad (24)$$

where $V_R$ and $V_{R'}$ are the respective reference voltages.

It follows that the differential output voltage (not shown) will be:

$$V_4-V_3=-(V_R-V_{R'})+AB-A'B'$$
$$+BK_{1'}\overline{S_1}$$
$$+(AK_2-A'K_{2'})\overline{S_2}$$
$$+K_1'K_2'\overline{S_1S_2} \quad (25)$$

Figure 10:
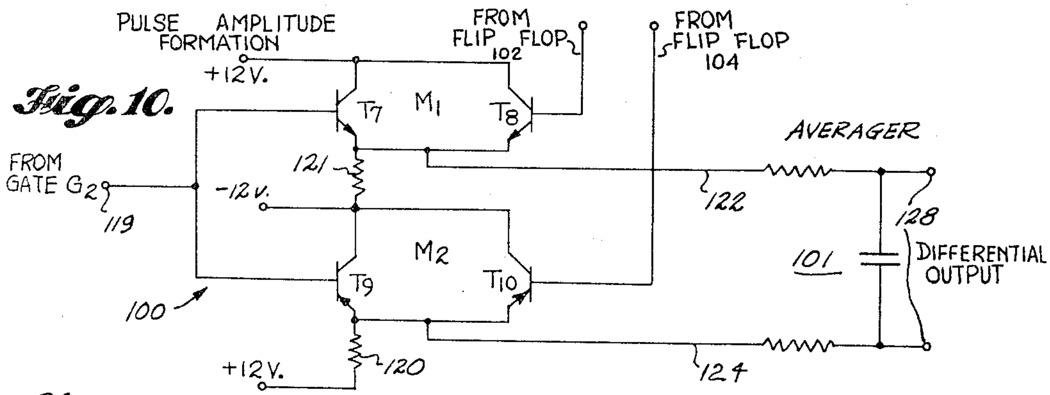
FIGURE 10 is a schematic diagram of simplified pulse-amplitude formation circuitry utilized in the embodiment shown in FIGURE 8.

A drift appearing at the output of comparator 132 or flip-flop 134 would cause parameters B and B′ to vary. Since the widths of both pulse trains are controlled by the same triggering circuitry, and since multiplier gate circuit stages $M_3$ and $M_4$ are both positively controlled as to width in a manner analogous to that in the circuit shown in FIGURE 10, the parameters B and B′ can be assumed equal. Similarly, A and A′, which are the reference amplitudes in the two halves $M_3$ and $M_4$ of multiplier gate circuit 136, can be made virtually equal so that the differential output is insensitive to changes in B due to drift. Further, drift in reference levels $V_R$ and $V_{R'}$ will tend to cancel, or if in the same direction, their effect can be either tolerated in the output, or removed by means of a D-C restoring output circuit such as the previously discussed.

Since $A=A'$, essentially, and since width dimension modulation in both multiplier stages $M_3$ and $M_4$ is controlled by the same circuitry, $K_2=K_{2'}$ and $\overline{S_2}$ term disappears.

It is seen that the $\overline{S_1}$ term is not cancelled, but filter 130 is included, as in the embodiment first discussed, to eliminate voltage components due to this term from the output signal. Thus the output signal is due solely to the product term $K_1K_{2'}\overline{S_1S_2}$.

It will be recognized by those skilled in the art that the circuit combinations disclosed herein for improving the quality of the correlator output voltage signal are subject to modification without departing from the principal features involved.

I claim as my invention:

1. In a time correlation computer which comprises means for sampling first and second input signals, including sample storage elements, means for generating recurring product pulses having amplitude-duration pulse envelopes V related to products of stored signal samples $S_1(t)$ and $S_2(t)$ of said first and second input signals, respectively, by the formula:

$$V=K_1S_1(t)+K_2S_2(t)+K_3+K_4S_1(t)S_2(t+\tau)$$

where $K_1$, $K_2$ and $K_3$ can take on constant values including zero, $K_4$ can take on constant values other than zero, and $\tau$ represents time-delays between samplings of the signals, and means for averaging said product pulses to derive correlation coefficient estimates for said signals, the improvement comprising high-pass filter means interposed between the respective sampling means and said product pulse generating means whereby to prevent generation in said estimates of significant signal contributions due to non-zero average values of $K_1S_1(t)$ or $K_2S_2(t)$, within the averaging period resulting from the finite number of samples derived during the averaging period of said averaging means.

2. A time correlation computer system comprising:

(1) first and second sampling means for deriving and storing samples of first and second input signals, respectively, including storage elements having storage time constants whereby signal samples stored therein decay significantly from their initial values according to predetermined decay functions;

(2) timing control means including means coupled to the sampling means and operable to establish differences in relative timing of sampling of the respective signals;

(3) means responsive to the sampling means and to the timing control means for generating product pulses each having an amplitude-duration envelope proportional in area to the product of the initial values of stored samples of the respective input signals, said product pulse generating means including (a) means for generating a waveform having a shape which is a predetermined function of said decay functions, (b) means for comparing said waveform with the decaying sample stored in one of said storage elements and operable to produce an output signal upon occurrence of a predetermined relationship between said waveform and the decaying sample, (c) and means responsive to said comparing means and to the other sampling means and operable to establish the area of said amplitude-duration envelope in response to said output signal, whereby the area of said envelope is proportional to the product of said initial sample values; and (4) means responsive to the pulse generating means for deriving the average of said product pulses.

3. The system defined in claim 2 wherein said comparing means comprises means operable to add said waveform and said decaying sample and operable to produce said output signal in response to amplitude coincidence between the instantaneous sum and a predetermined reference value, and wherein said means responsive to the comparing means includes means for establishing the duration of said pulse in accordance with the timing of said output signal and means for establishing the amplitude of said pulse in accordance with the sample stored in said other sampling means.

4. The system defined in claim 2 wherein said storage elements are condensers and said decay functions are exponential functions.

5. A time correlation computer system comprising means for recurringly deriving samples of first and second input signals; means for generating product pulses having amplitude-duration envelopes proportional in area to the products of samples of the respective signals derived at different times; and averaging means responsive to said product pulse generating means to derive correlation coefficient estimates for said signals; said product pulse generating means including first and second output channels for producing complementary product pulses, pulse amplitude control means coupled to said channels and responsive to the sample deriving means to control the amplitudes of product pulses in the first channel to increase in magnitude in proportion to the amplitudes of samples of the first input signal and to control amplitudes of product pulses in the second channel to decrease in magnitude in proportion to the amplitudes of samples of the first input signal, and pulse duration control means coupled to said channels and responsive to the sample deriving means to control the duration of product pulses in one channel to increase in proportion to samples of the second input signal and the duration of product pulses in the other channel to decrease in proportion to samples of the second input signal.

6. A time correlation computer system comprising means for recurringly deriving samples of first and second input signals; means for generating product pulses having amplitude-duration envelopes proportional in area to the products of samples of the respective signals derived at different times; and averaging means responsive to said product pulse generating means to derive correlation coefficient estimates for said signals; said product pulse generating means including first and second output channels for producing complementary product pulses, pulse amplitude control means coupled to said channels and responsive to the sample deriving means to control the amplitudes of produced pulses in said first and second channels in proportion to the amplitudes of samples of the first input signal, and pulse duration control means coupled to said channels and responsive to the sample deriving means to control the durations of product pulses in the first channel to increase in proportion to samples of the second input signal and the durations of product pulses in the second channel to decrease in proportion to samples of the second input signal, said pulse duration control means having means for generating start commands for product pulses in one channel, means for generating stop commands for product pulses in the other channel, and means for generating simultaneous stop and start commands for simultaneously terminating product pulses in said one channel and starting product pulses in said other channel at times established by samples of the second input signal.

7. The system defined in claim 6 wherein said pulse duration control means includes an input trigger circuit coupled with the sample deriving means and operable recurringly to generate input triggers timed in accordance with samples of the second input signal, timing control means, and an output dual trigger circuit including first and second bistable circuits having first inputs respectively coupled to said timing control means and having a common second input coupled to said input trigger circuit, said bistable circuits being recurringly conditioned in respective first operation states by said timing control means prior to said input triggers and operable simultaneously to change to respective second operation states in response to said input triggers, thereby to produce said simultaneous stop and start commands.

8. The system defined in claim 6 wherein said first and second output channels include first and second gate circuits, respectively, rendered conductive and nonconductive by respective start and stop commands provided by said pulse duration control means, and wherein said pulse amplitude control means comprises a common connection between said gate circuits and the sample deriving means, said gate circuits having respective outputs coupled to said averaging means whereby to separately apply thereto signals proportional to samples of said first input signal during their respective conductive periods.

9. The system defined in claim 8 wherein one of said first and second gate circuits is operable during its conductive period to produce a product pulse traversing negatively from a first reference level, and the other of said gate circuits is operable during its conductive period to produce a product pulse traversing positively from a second reference level which is negative relative to the first reference level, said second gate circuit being operable to produce product pulses which assume the peak voltage value of product pulses produced by said first gate circuit upon occurrence of said simultaneous stop and start commands.

10. The system defined in claim 9 wherein said first and second gate circuits comprise first and second D-C voltage sources; first and second gating transistors each having emitter and collector connections to said D-C voltage sources and having a common base input connection responsive to samples of the first input signal; and first and second corresponding switching transistors coupled with said gating transistors and also having connections to said D-C voltage sources, the first switching transistor being coupled to render the first gating transistor conductive in response to the first-mentioned start command, the second switching transistor being coupled to render the second gating transistor nonconductive in response to the first-mentioned stop command, and said switching transistors being operable to render the second gating transistor conductive and the first nonconductive upon occurrence of said simultaneous stop and start commands whereby a voltage proportional to a sample of the first input signal is first applied by the one and thereafter by the other to said averaging means.

11. The system defined in claim 6 including timing control means coupled to said sample deriving means for varying at a predetermined rate of change relative timing of derivation of the respective signal samples in proportion to which the amplitudes and durations of said pulses are controlled, and wherein said means for deriving the average of said product pulses comprises an RC filter responsive to said pulse generating means and having a time constant which is long relative to the reciprocal of the frequency of product pulses generated thereby and short relative to the rate of change of said relative timing whereby relative timing change within any time constant period is substantially negligible.

12. The system defined in claim 11 wherein said means for varying relative timing comprises adjustment means operable to vary said relative timing in discrete stages, each such stage having a time-length longer than said filter time constant.

13. The system defined in claim 11 wherein said means for varying relative timing comprises adjustment means operable to vary said relative timing continuously at a rate of change whereby the incremental timing change $\delta\tau$ during any time constant T of said filter is small relative to the maximum delay at which correlation is sought.

14. A time correlation computer system comprising means for recurringly deriving samples of first and second input signals; means for generating product pulses having amplitude-duration envelopes proportional in area to products of samples of the respective signals derived at different times; and averaging means responsive to said product pulse generating means to derive correlation coefficient estimates for said signals; said product pulses generating means including first and second output channels, pulse duration control means coupled to said output channels and responsive to the sample deriving means to control the durations of product pulses in said output channels in proportion to samples of the second input signal, pulse amplitude control means coupled to the first output channel and responsive to the sample deriving means to control the amplitudes of product pulses in the first output channel in proportion to samples of the first input signal, and means coupled to the second output channel for maintaining the amplitudes of product pulses therein equal to a predetermined constant value; said system further having output means coupled with said averaging means and operable to derive an output voltage proportional to the difference between the time averages of pulses generated in the respective output channels.

15. The system defined in claim 14 wherein said system further includes high-pass filter means interposed between the sample deriving means and said first output channel whereby to remove from said average the effects of D-C and low frequency signal components occurring at the output of said second sampling means.

16. In a time correlation computer system which comprises means for sampling first and second input signals including means for storing samples of the first input signal, timing control means, means responsive to the timing control means for generating recurring product pulses having amplitude-duration envelopes proportional in area to products of first and second signal samples derived at different times, and means for deriving the average of said product pulses to derive correlation coefficient estimates for said signals; the improvement comprising an additional sampling means responsive to the timing control means and coupled to said means for storing samples of the first input signal and operable to derive samples corresponding in value to samples stored therein, and means for simultaneously applying samples derived by said second and additional sampling means to said pulse generating means during a period corresponding to sampling of the first input signal by said first signal sampling means.

17. A time correlation computer system comprising first and second sampling means for recurringly deriving and storing discrete voltage samples of first and second input signals, respectively, timing control means including means coupled to said sampling means and operable to establish differences in relative timing of sampling of the respective signals, means responsive to the sampling means and the timing control means and operable to generate at a predetermined frequency product pulses having amplitude-duration envelopes proportional to products of stored signal samples, and means responsive to the generator means for deriving the average of said product pulses, said sampling means each comprising an output storage condenser on which said voltage samples are stored and a sampling circuit operable in response to the timing control means to be switched between a conductive state, wherein the voltage on said condenser tracks the input signal, and a nonconductive state, wherein the voltage on said condenser at the time of switching is held on said condenser, said timing control means being operable to render each sampling circuit conductive for recurring input signal tracking periods each comprising a substantial portion of the cycle of the applied input signal.

18. The system defined in claim 17 wherein said sampling circuit comprises a four-diode bridge having input and output terminals and first and second control terminals, having said storage condenser connected to said output terminal whereby voltage thereon is controlled by said bridge, and a control circuit comprising D-C voltage sources connected in normally forward-biasing polarity to said control terminals whereby current controlled by input terminal voltage is caused to flow in the bridge, said timing control means including a source of control voltages connected to said control terminals and having first and second output control voltage states, said control voltage source being operable in the first control voltage state to maintain said control terminals in said forward biasing polarity, and in the second control voltage state to reverse bias said bridge by effecting a reverse-biasing current connection between said control terminals and said D-C voltage sources.

References Cited

UNITED STATES PATENTS

| | | | |
|---|---|---|---|
| 2,995,305 | 8/1961 | Schmid | 235—194 |
| 3,011,129 | 11/1961 | Magleby | 328—151 |
| 3,045,916 | 7/1962 | Downes | 235—181 |
| 3,333,091 | 7/1967 | Masak | 235—181 |
| 3,336,518 | 8/1967 | Murphy | 328—151 |

OTHER REFERENCES

IBM Tech. Disclosure Bull., vol. 9, No. 5, October 1966, pp. 476–477 (by Benson et al.), temp. compensation for sample and hold circuit.

MALCOLM A. MORRISON, *Primary Examiner.*

FELIX D. GRUBER, *Assistant Examiner.*

U.S. Cl. X.R.

235—183, 194; 324—77; 328—151